United States Patent
Lutze et al.

(10) Patent No.: US 9,676,062 B2
(45) Date of Patent: Jun. 13, 2017

(54) PROCESS FOR PRODUCING A LINE OF WEAKNESS IN A COVER ELEMENT THROUGH REMOVAL OF MATERIAL

(71) Applicant: JENOPTIK Automatisierungstechnik GmbH, Jena (DE)

(72) Inventors: Walter Lutze, Jena (DE); Martin Griebel, Jena (DE); Juergen Weisser, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 233 days.

(21) Appl. No.: 14/734,198

(22) Filed: Jun. 9, 2015

(65) Prior Publication Data

US 2015/0352670 A1 Dec. 10, 2015

(30) Foreign Application Priority Data

Jun. 10, 2014 (DE) .................. 10 2014 108 133

(51) Int. Cl.
| | |
|---|---|
| *B23K 26/364* | (2014.01) |
| *B23K 26/0622* | (2014.01) |
| *B23K 26/03* | (2006.01) |
| *B23K 26/402* | (2014.01) |

(Continued)

(52) U.S. Cl.
CPC .......... *B23K 26/364* (2015.10); *B23K 26/032* (2013.01); *B23K 26/0622* (2015.10); *B23K 26/082* (2015.10); *B23K 26/402* (2013.01); *B23K 2203/30* (2015.10)

(58) Field of Classification Search
CPC ................................................... B23K 26/364
See application file for complete search history.

(56) References Cited

U.S. PATENT DOCUMENTS

| | | | | |
|---|---|---|---|---|
| 5,882,572 | A | * 3/1999 | Lutze | B23K 26/009 |
| | | | | 219/121.71 |
| 6,337,461 | B1 | 1/2002 | Yasuda et al. | |

(Continued)

FOREIGN PATENT DOCUMENTS

| | | |
|---|---|---|
| DE | 11 2006 000 443 T5 | 1/2008 |
| DE | 10 2006 054 592 B3 | 2/2008 |

(Continued)

*Primary Examiner* — Benjamin Schiffman
(74) *Attorney, Agent, or Firm* — Duane Morris LLP

(57) ABSTRACT

Process for producing a line of weakness in a cover element comprising at least one slit. This slit is produced through a plurality of machining cycles in which a pulsed laser beam is guided in each instance over the cover element along an imaginary line so that the energy of the laser pulses is introduced into the cover element. The slits are produced in two segments. More energy is introduced over the machining cycles in the first, comparatively short segments than in the second, comparatively long segments. The residual wall below the slits decreases with each machining cycle until the first residual wall segment thickness in the first segment is so small that energy portions transmit through the first residual wall segment and are detected by a sensor arrangement arranged downstream. Accordingly, the first residual wall segment thickness is detected, and inferences can be drawn from this about the second residual wall segment thickness.

8 Claims, 7 Drawing Sheets

(51) Int. Cl.
*B23K 26/082* (2014.01)
*B23K 103/00* (2006.01)

(56) References Cited

U.S. PATENT DOCUMENTS

| | | | | |
|---|---|---|---|---|
| 6,680,459 B2 * | 1/2004 | Kanaya | ............ | B23K 26/04 |
| | | | | 219/121.67 |
| 7,165,782 B2 * | 1/2007 | Yasuda | ............ | B60R 21/2165 |
| | | | | 264/400 |
| 7,297,897 B2 * | 11/2007 | Nicholas | ............ | B23K 26/03 |
| | | | | 219/121.7 |
| 7,323,131 B2 | 1/2008 | Lutze et al. | | |
| 7,572,122 B2 * | 8/2009 | Bauer, Jr. | ............ | B23K 26/03 |
| | | | | 219/121.68 |
| 7,690,677 B2 * | 4/2010 | Cowelchuk | ............ | B60R 21/2165 |
| | | | | 280/728.1 |
| 7,748,733 B2 * | 7/2010 | Griebel | ............ | B60R 21/2165 |
| | | | | 280/728.3 |
| 7,770,916 B2 * | 8/2010 | Okumura | ............ | B23K 26/04 |
| | | | | 280/728.3 |
| 7,976,764 B2 | 7/2011 | Schlemmer et al. | | |
| 9,421,937 B2 * | 8/2016 | O'Gara | ............ | B60R 21/2165 |

FOREIGN PATENT DOCUMENTS

| | | |
|---|---|---|
| DE | 10 2007 013 108 B3 | 8/2008 |
| DE | 10 2013 104 138 B3 | 3/2014 |
| EP | 0 991 551 B1 | 10/2001 |
| WO | WO 99/01317 A1 | 1/1999 |
| WO | WO 2005/049261 A1 | 6/2005 |

\* cited by examiner

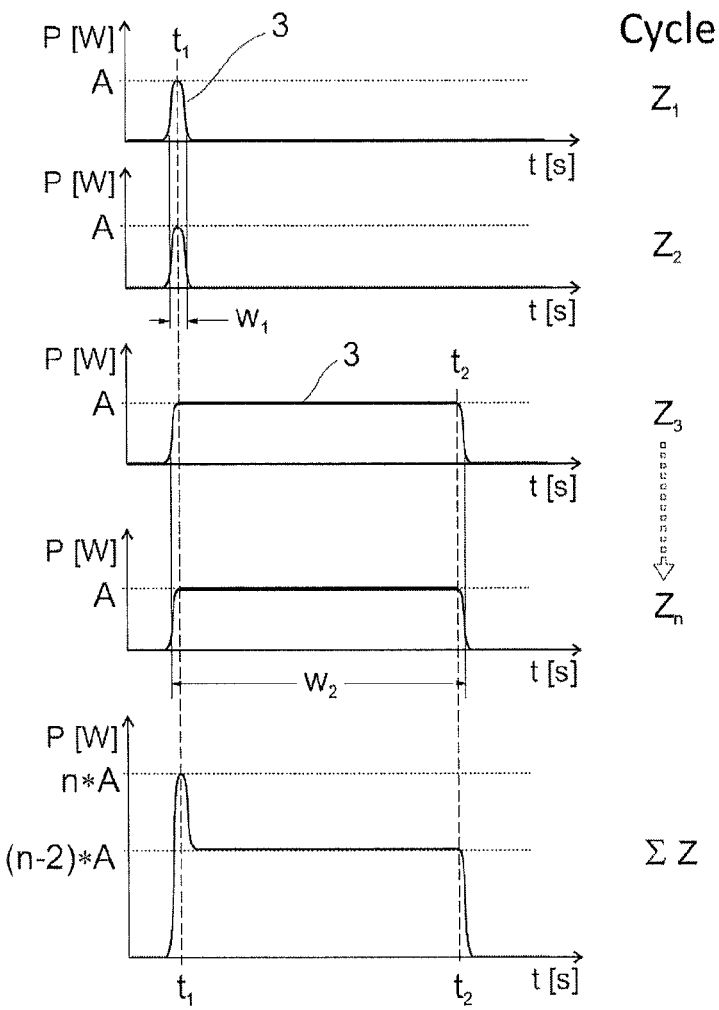
Fig. 1a
Fig. 1b
Fig. 1c
Fig. 1d
Fig. 1e
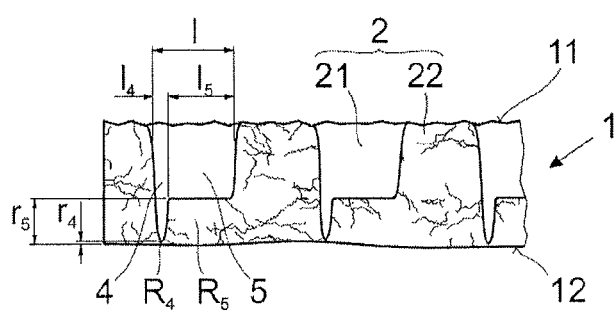
Fig. 1f
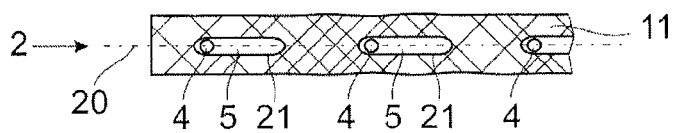
Fig. 1g

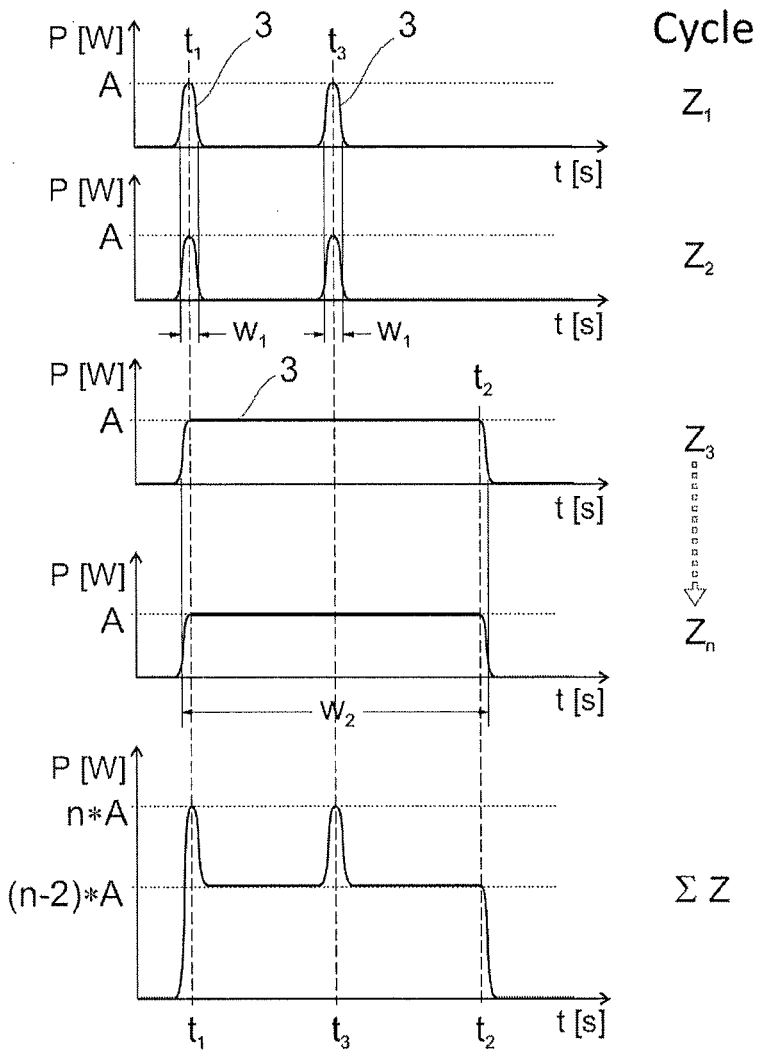
Fig. 2a
Fig. 2b
Fig. 2c
Fig. 2d
Fig. 2e
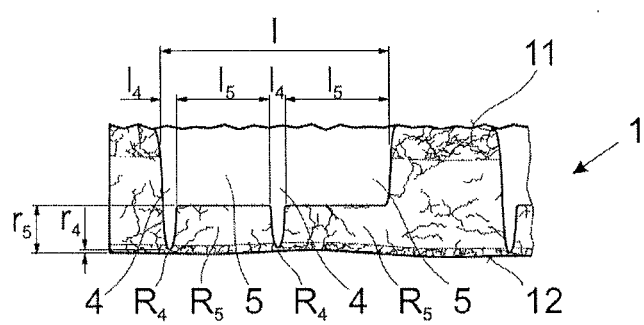
Fig. 2f
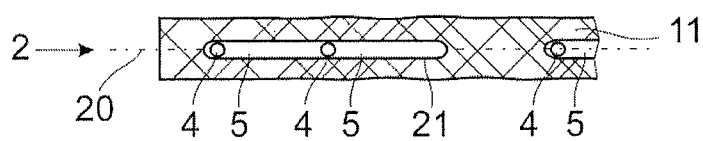
Fig. 2g

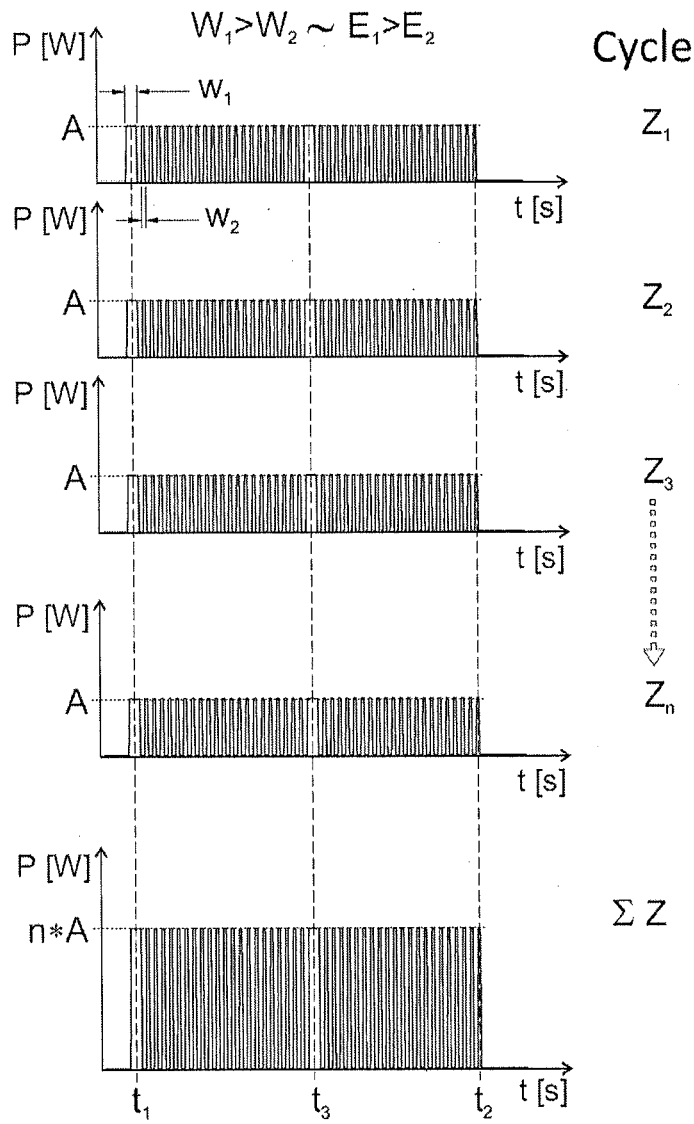
Fig. 5a
Fig. 5b
Fig. 5c
Fig. 5d
Fig. 5e
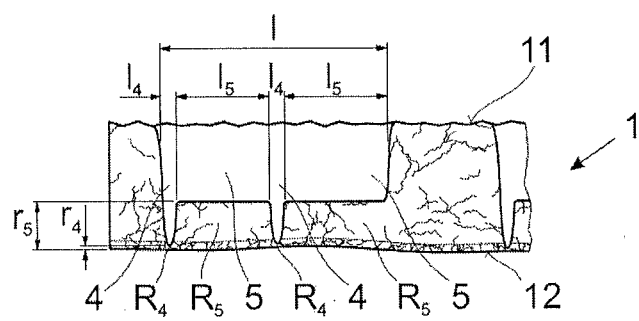
Fig. 5f
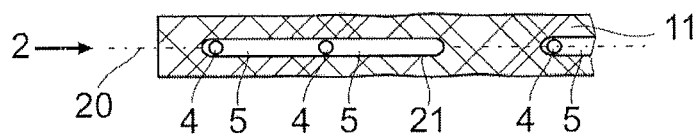
Fig. 5g

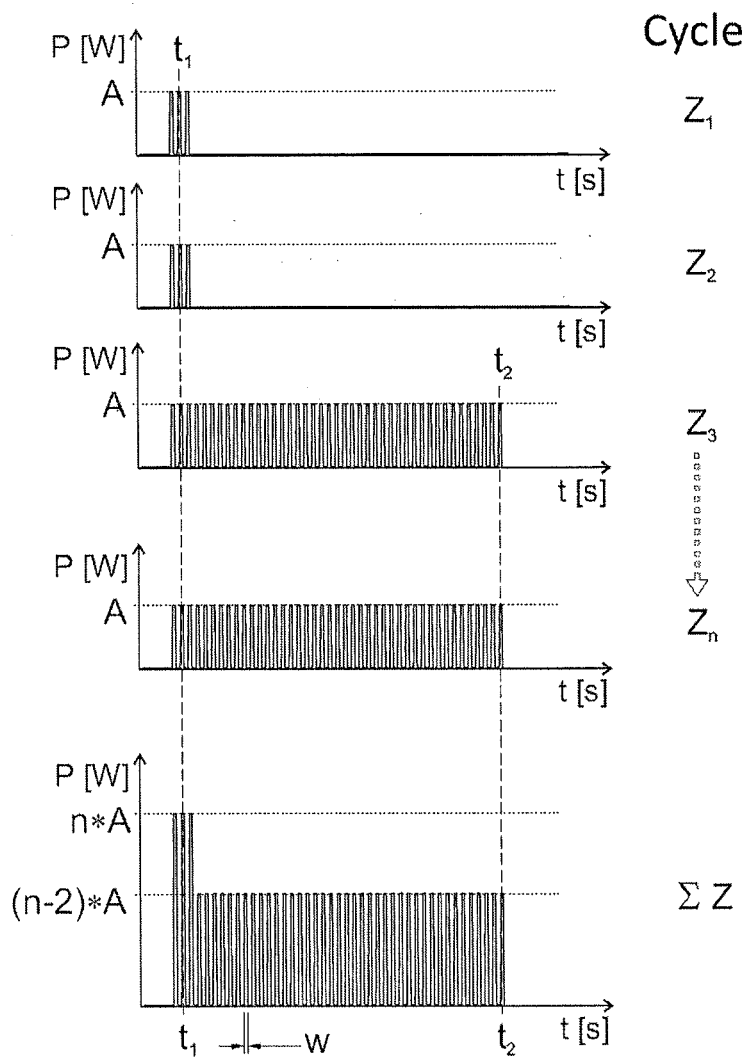
Fig. 6a
Fig. 6b
Fig. 6c
Fig. 6d
Fig. 6e
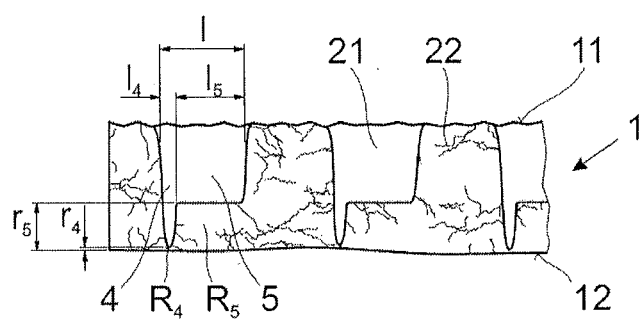
Fig. 6f
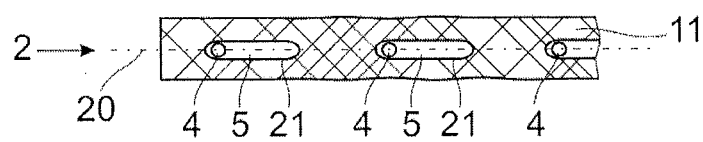
Fig. 6g

PROCESS FOR PRODUCING A LINE OF WEAKNESS IN A COVER ELEMENT THROUGH REMOVAL OF MATERIAL

RELATED APPLICATIONS

The present application claims priority benefit of German Application No. DE 10 2014 108 133.1 filed on Jun. 10, 2014, the contents of which are incorporated by reference in its entirety.

BACKGROUND OF THE INVENTION

The invention is directed to a process for producing a line of weakness in a cover element through removal of material by laser as is known generically from patent publication DE 10 2013 104 138 B3.

In the present day, the use of airbag systems in vehicles or other means of transport is generally standard. Airbags are arranged as inconspicuously as possible behind parts of the interior trim of the vehicles so as not to infringe upon the aesthetic sensibility of passengers. The interior trim, hereinafter "cover element", generally comprises stable, two-dimensionally extensive molded parts of plastic or composite materials. Since the airbags are ejected through the cover element in the event of activation, airbag flaps must be provided in the cover element. The airbag flaps are often formed by specially constructed areas of the cover element having predetermined breaking points which are introduced along the edges of the airbag flaps and which ensure that the cover element tears open reliably and in a defined manner.

In high-quality constructions of cover elements, a stable, shape-imparting layer is often provided with covering materials through which the surface of the cover element presenting toward the passenger space is visually and tactilely experienced. These covering materials are generally foam and flexible, thin-walled materials such as plastic sheeting, imitation leather, textile knits, microfiber webs or genuine leather. For reliable deployment of the airbag, the covering materials must also be provided with predetermined breaking points in the area of the airbag flaps. For this purpose, lines of weakness are introduced in precisely the same manner as in the stable, shape-imparting layers. For visual reasons, these lines of weakness are generally introduced from the back side of the covering material that is not visible from the passenger compartment. In addition to an exactly definable residual tear strength of the line of weakness, very high quality standards for the surfaces are only met when the line of weakness is not discernible visually or tactilely on the visible side of the covering material presented to the passenger.

There are a variety of methods for introducing the lines of weakness.

DE 10 2006 054 592 B3 discloses a method in which weakened areas are introduced by laser in a cover element (referred to in the above-cited publication as decorative composite) comprising layers. A decorative composite generally includes a decorative material on the visible side and a decorative material support, between which are arranged one or more layers of a padding. The weakening is introduced in a plurality of successive work cycles. In a first work cycle, a non-penetrating pre-weakening of the decorative support is carried out and a post-weakening in the form of perforation holes penetrating the decorative support is carried out in the pre-weakened areas in at least one second work cycle. There remain between the pre-weakened areas or perforation holes, unweakened bridges which are post-weakened in a second work step with at least one pocket hole. The above-cited publication does not provide specifics on the execution of the perforation holes or on adapting the perforation depth to variations in thickness of the decorative materials.

A further laser process is described in the publication DE 11 2006 000 443 T5. In this case, perforation holes are introduced into cover elements (referred to as airbag covers in the above-cited publication), e.g., instrument panels, by means of a pulsed laser beam. An instrument panel is formed of a base layer and a thinner skin layer (visible side) of plastic. The perforation holes are introduced from the base layer side and can extend into the skin layer. Deep main recesses and shallower auxiliary recesses are formed by laser pulses with different pulse durations. This publication also does not mention adapting the perforation depth to possible thickness variations in the layers.

A process in which a line of weakness is produced by perforating a cover element (referred to as trim part) with a leather decorative layer by means of a pulsed laser is disclosed in Laid Open Application WO 2005/049261 A1. The perforation is formed by a plurality of individual perforation holes which are arranged along the line of weakness so as to be separated by remaining bridges.

As in the publications acknowledged as prior art in the above-mentioned WO 2005/049261 A1, the line of weakness is introduced during a movement of the laser relative to the covering material that is executed once, and perforation hole holes are made one at a time successively during this one-time relative movement. The depth of the perforation is influenced and the remaining residual wall thickness of the covering material is adjusted, respectively, by correspondingly adapting the pulse duration and the laser power in relation to the speed of the relative movement.

Further, steps are suggested for minimizing the heat load on the covering material during laser machining. To this end, the perforation holes arranged consecutively on the line of weakness are produced by short and ultrashort laser pulses, respectively, with corresponding intervals between the individual laser pulses. In accordance with the disclosed process, it must be assumed that these intervals are achieved by reducing the pulse frequency so that the energy inputs of the laser pulses which otherwise impinge at higher frequency cannot add up over time.

As opposed to the processes mentioned above, a line of weakness with defined tear strength and appreciably reduced range of variation of the tear strength can be produced by this process. The machining process is protracted owing to the intervals between the laser pulses and the reduced pulse frequency of the laser for this purpose.

A similar process is disclosed in patent publication DE 10 2007 013 108 B3. The cover element to be perforated in this case has alternating areas of thicker and thinner material over the course of the perforation line to be produced in which the pulsed laser is operated in a first laser regime or second laser regime, respectively, to generate the desired residual wall thicknesses of the pocket holes. The areas of material thickness are detected in the first laser regime by means of a defined, uniform indication pulse sequence of the laser beam which is applied at the start of every perforation hole. In the area of less thick material, the indication pulse sequence is sufficient to produce a pocket hole until transmitting laser radiation is detected. A sufficient perforation cannot be achieved by the indication pulse sequence in the thicker material area, so that the second laser regime with a higher laser power is switched to at the end of the indication pulse sequence for producing the pocket hole. This process is inherently unsuited to adjust the thickness of the residual wall.

The above-cited patent publication DE 10 2013 104 138 B3 describes a process for introducing a defined line of weakness in a covering material by removal of material in which the line-shaped guiding of a pulsed laser beam such as is known from the above-cited publications is a scanning motion which is repeated a plurality of times and in which only one laser pulse is emitted for each impingement location along the line. The parameters of the laser pulse are selected in such a way that this laser pulse causes an input of energy which leads to a heating of the covering material to a temperature above an ablation threshold at the respective impingement location, but the temperature in areas of the covering material adjoining the respective impingement location is kept below a limiting temperature that would lead to changes in the structure of the covering material.

The multiple repetition of the scanning movement can be carried out until a small residual wall thickness is achieved so that the laser radiation that is now transmitted is detected by a sensor. When the minimum permissible residual wall thickness is reached at an individual impingement location, a spatially resolved cutoff of the laser beam takes place during the scanning movement.

The speed of the scanning movement and the pulse repetition frequency of the pulsed laser beam are adapted to one another so that only one laser pulse impinges per impingement location.

Alternatively, the laser beam can advantageously be switched on and switched off during the repeated scanning movement corresponding to a fixed regime. The line of weakness introduced along the line has the form of a slit/bridge line with an alternating succession of slits and bridges.

By detecting when a minimum residual wall thickness is reached per impingement location and effecting a corresponding spatially resolved cutoff, a line of weakness having a tear strength that is constant along the length thereof regardless of fluctuations in material thickness can be produced. Consequently, the amount of tear resistance cannot be influenced via the remaining residual wall thickness in this case and must consequently be adjusted via the quantity of impingement locations or the perforation holes which are formed so as to penetrate up to a residual wall and by the spacing and bridge lengths of these perforation holes. Perforation holes or slits with differing residual wall thicknesses or with residual wall thicknesses which are not yet detectable because a possibly transmitting laser radiation is still below the threshold of the sensor cannot be produced with this process. Accordingly, the residual wall thickness can only be used to a very limited extent for adjusting a desired tear strength or degree of weakness, and the process is wholly unsuitable for many materials because a minimum residual wall thickness along the entire line of weakness does not guarantee that the latter will be consistently invisible.

In a process and an airbag cover disclosed in patent publication EP 0 991 551 B1, a line of weakness is generated by a succession of a plurality of consecutively produced perforation holes by means of a pulsed laser beam. The perforation holes can be introduced so as to overlap one another or so as to be spaced apart from one another by remaining bridges. The perforation holes are completed as soon as a transmission of laser radiation is detected through the remaining bridge. Lines of weakness, sections in the line of weakness or individual holes can also be produced in addition to the perforation without completely perforating the material. The depth of this non-perforating weakening can be estimated and adjusted based on the quantity of pulses and/or the pulse duration required for producing a perforation. The publication does not disclose more precise instructions for adjusting the depth.

SUMMARY OF THE INVENTION

It is an object of the invention to improve a process according to the above-cited DE 10 2013 104 138 B3 and EP 0 991 551 B1 such that a line of weakness having slits with a freely selectable residual wall thickness can be produced in a cover element by this process.

This object is met for a process for producing a line of weakness through removal of material at a cover element having a visible side and a back side opposite the visible side. As in the prior art, laser pulses with an energy determined by a pulse amplitude and a pulse length are directed to the back side and are repeatedly guided along an imaginary line at a forward feed speed in a machining cycle. In so doing, the energy of the laser pulses is introduced in the cover element. A line of weakness is formed as a result of removal of material in the form of at least one slit with a slit length. A residual wall existing below the at least one slit and adjoining the visible side has a residual wall thickness which steadily decreases with each machining cycle until it is so small that energy portions of the laser pulses which transmit through the residual wall are detected by a sensor arrangement arranged on the visible side.

An energy introduced point by point along the at least one slit along the imaginary line is greater in at least one first segment with a first length than in at least one second segment with a second length such that, in each instance, a first residual wall segment thickness of a first residual wall segment of the residual wall along the at least one first segment decreases more quickly than a second residual wall segment thickness of a second residual wall segment of the residual wall along the at least one second segment so that, in each instance, the first residual wall segment thickness of the first residual wall segment along the at least one first segment is detected before the second residual wall segment thickness for the second residual wall segment along the at least one second segment can be detected, and inferences can be drawn from this about the second residual wall segment thickness of the second residual wall segment along the at least one second segment without detecting this second residual wall segment thickness.

The energy input per slit along the slit length of the at least one first segment at least in the first of the machining cycles is advantageously carried out by means of at least one of the laser pulses. This laser pulse has a comparatively short pulse length, and the energy input in further machining cycles along the slit length of the slit is carried out by means of one of the laser pulses which has a comparatively long pulse length.

In this connection, it is advantageous when the pulse amplitude of the laser pulses is the same at least over one of the machining cycles.

Alternatively, the energy input per slit and per machining cycle can advantageously be carried out in each instance with at least one same laser pulse which is amplitude-modulated over its pulse length with a comparatively larger pulse amplitude for the energy input along the length of the at least one first segment and a comparatively smaller pulse amplitude for the energy input along the length of the at least one second segment.

The energy input per slit and per machining cycle can also be carried out advantageously with a same sequence of laser pulses in which at least one of the laser pulses has a comparatively larger pulse amplitude for the energy input along the length of the at least one first segment and a plurality of the laser pulses having a comparatively smaller pulse amplitude for the energy input along the length of the at least one second segment follow one another directly.

It is also advantageous when the energy input per slit and per machining cycle is carried out with a same sequence of laser pulses in which at least one of the laser pulses has a comparatively longer pulse length for the energy input along the length of the at least one first segment and a plurality of the laser pulses having a comparatively smaller pulse amplitude for the energy input along the length of the at least one second segment follow one another directly. The pulse amplitude of the laser pulses with the comparatively longer pulse length is not larger than the pulse amplitude of the laser pulses with the comparatively shorter pulse length.

It is particularly advantageous when the energy input per slit along the length of the at least one first segment is carried out at least in the first of the machining cycles by means of at least one of the laser pulses, and along the slit length of the slit in further machining cycles of the machining cycles the energy input is carried out with a same sequence of laser pulses, and the sequence of laser pulses comprises a larger quantity of laser pulses than laser pulses participating in the energy input per slit in the at least first machining cycle of the machining cycles, and the pulse length and the pulse amplitude of all of the laser pulses are constant at least over one of the machining cycles.

A further machining of the second segments can be carried out subsequent to the machining cycles which define the process.

BRIEF DESCRIPTION OF THE DRAWINGS

The invention will be described more fully in the following with reference to embodiment examples. The accompanying drawings show:

FIGS. 1a-1e are power-time diagrams for the laser pulses for producing a slit according to a first embodiment example of the process of the invention;

FIGS. 1f and 1g are sectional and top views respectively of an exemplary line of weakness produced by the embodiment of the invention illustrated in FIGS. 1a-1e;

FIGS. 2a-2e are power-time diagrams for the laser pulses for producing a slit according to a second embodiment example of the process of the invention;

FIGS. 2f and 2g are sectional and top views respectively of an exemplary line of weakness produced by the embodiment of the invention illustrated in FIGS. 2a-2e;

FIGS. 5a-5e are power-time diagrams for the laser pulses for producing a slit according to a fifth embodiment example of the process of the invention;

FIGS. 5f and 5g are sectional and top views respectively of an exemplary line of weakness produced by the embodiment of the invention illustrated in FIGS. 5a-5e;

FIGS. 6a-6e are power-time diagrams for the laser pulses for producing a slit according to a sixth embodiment example of the process of the invention;

FIGS. 6f and 6g are sectional and top views respectively of an exemplary line of weakness produced by the embodiment of the invention illustrated in FIGS. 6a-6e.

DESCRIPTION OF THE EMBODIMENTS

Figure 3A:
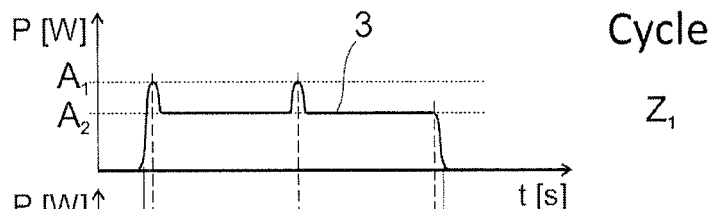
FIGS. 3a-3e are power-time diagrams for the laser pulses for producing a slit according to a third embodiment example of the process of the invention.
Figure 3B:
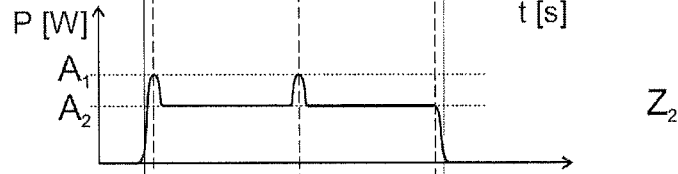
Figure 3C:
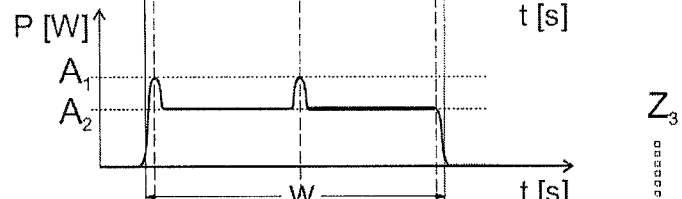
Figure 3D:
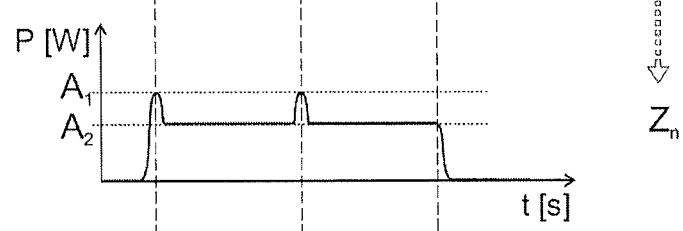
Figure 3E:
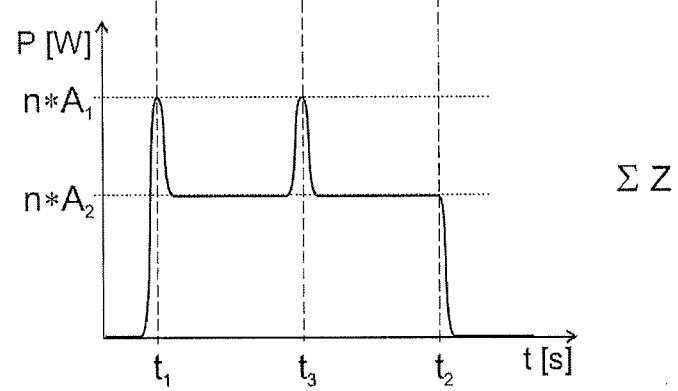
Figure 3F:
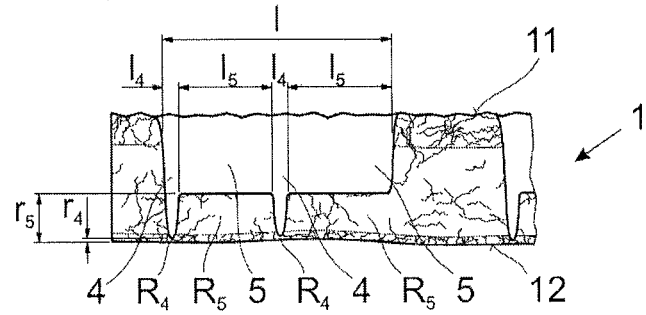
FIGS. 3f and 3g are sectional and top views respectively of an exemplary line of weakening produced by the embodiment of the invention illustrated in FIGS. 3a-3e.
Figure 3G:
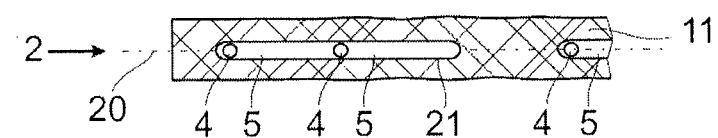
Figures 4A, 4B, 4C, 4D, 4E, 4F, 4G:
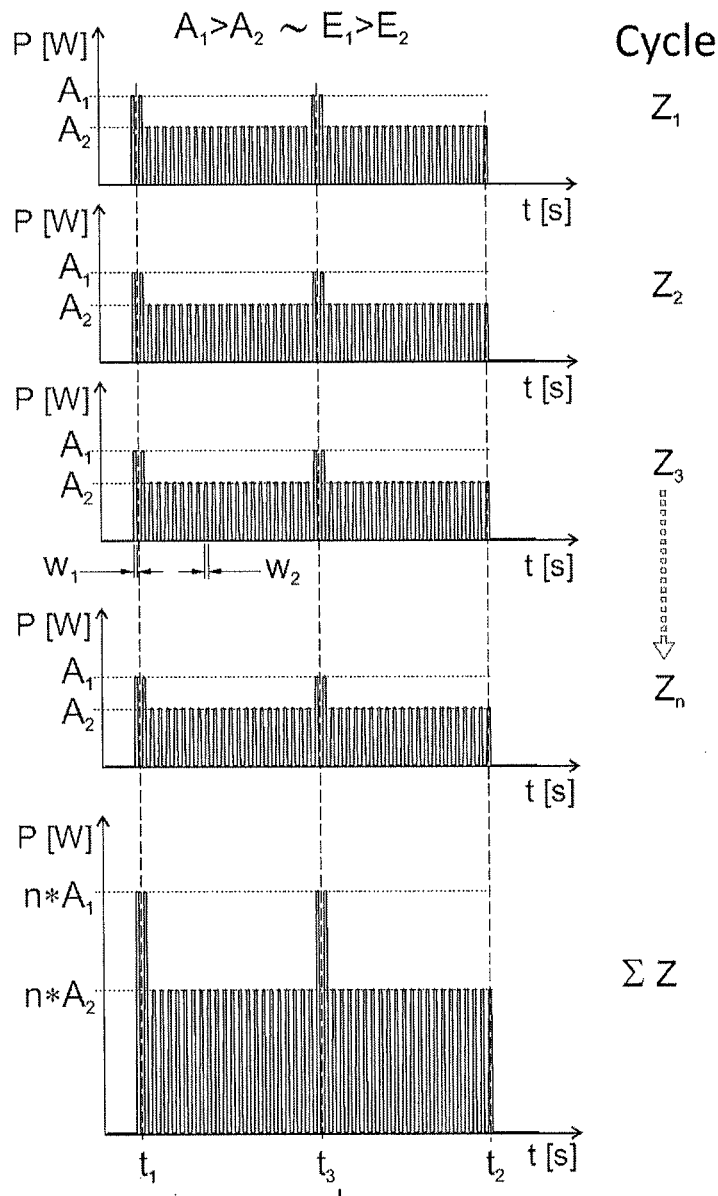
FIGS. 4a-4e are power-time diagrams for the laser pulses for producing a slit according to a fourth embodiment example of the process of the invention.
FIGS. 4f and 4g are sectional and top views respectively of an exemplary line of weakness produced by the embodiment of the invention illustrated in FIGS. 4a-4e.

A defined line of weakness 2 is produced by the process in a cover element 1. The cover element 1 has a defined tear strength along the line of weakness 2 and consequently can be torn out with a defined tearing force. As used herein, cover element 1 means any interior trim part of a vehicle behind which an airbag can be placed regardless of whether it comprises one layer or more layers.

The line of weakness 2 is introduced by removal of material by means of a pulsed laser beam 7. The line of weakness 2 is introduced on a back side 12 of the cover element 1 facing away from an observer in the subsequent installed condition and cannot be seen or felt on a visible side 11 which faces the observer.

The line of weakness 2 can be formed of an individual slit 21 or a plurality of slits 21 which are separated from one another in each instance by a bridge 22. The production of the slits 21 is key to the invention.

Basically, the pulsed laser beam 7 emitted by a laser 6 is directed to the back side 12 of the cover element 1 and is guided relative to it at a forward feed speed repeatedly along an imaginary line 20 along which the line of weakness 2 is to be introduced.

To achieve a high forward feed speed, the pulsed laser beam 7 is preferably moved over the stationary cover element 1, preferably by a scanner 9. The machining can be carried out always in the same direction or in alternating directions.

Laser pulses 3 forming the pulsed laser beam 7 impinge on the cover element 1 along the imaginary line 20. The one-time guiding of the laser beam 7 along the imaginary line 20 is understood in the following as a machining cycle Z so that the process comprises a plurality of machining cycles Z. Material is removed with every machining cycle Z by the action of at least one of the laser pulses 3 and, therefore, also by the introduction of the energy the laser pulse into the cover element 1.

Due to inhomogeneities in the material of the cover element 1, the removal of material, for example, may be carried out at differing speeds within a slit 21 being formed and between the slits 21 in spite of identical process parameters. Accordingly, as the number of machining cycles Z increases, the depth of the slits 21 does not increase uniformly and the thickness, hereinafter residual wall thickness, of a residual wall remaining below the slits 21 also does not decrease identically even with a constant thickness of the cover element 1 and with homogeneous material of the cover element 1. With knowledge of the material parameters, the residual wall thickness can be determined from the detected energy portion or sensor signal.

If the imaginary line 20 is considered as a stringing together of imaginary points, the idea behind the invention can be explained in that the points of the imaginary line 20 along which a slit 21 is formed are acted upon either with a comparatively higher energy or a comparatively lower energy considered over the total machining time of all of the machining cycles Z of the process. First segments 4 of the slits 21 are formed along individual or directly adjacent points to which the comparatively higher energy is applied. Second segments 5 of the slits 21 are formed along the directly adjacent points to which the comparatively lower energy is applied. A point can be described, e.g., by the smallest possible cross section of a laser pulse 3 impinging with a minimum pulse length w.

Every slit 21 accordingly has at least one first segment 4 which extends in each instance over one or more points of the imaginary line 20 and at least one second segment 5. The second segment 5, or second segments 5, comprises all of the points of the imaginary line 20 at which a comparatively lower energy input takes place.

Consequently, the residual wall of a slit 21 is composed of first residual wall segments $R_4$ with a first residual wall segment thickness $r_4$ below the first segment 4 and second residual wall segments $R_5$ with a second residual wall segment thickness $r_5$ below the second segments 5. The first residual wall segment thickness $r_4$ and second residual wall segment thickness $r_5$ can vary within or between the slits 21 after each machining cycle Z. The first residual wall segment thickness $r_4$ and the second residual wall segment thickness $r_5$ along the line of weakness 2 are identical only at the conclusion of the process.

A slit length l of slit 21 is composed of the quantity of first segments 4 multiplied by the first length $l_4$ of one of the first segments 4 and the quantity of second segments 5 multiplied by the second length $l_5$ of one of the second segments 5.

In principle, it is sufficient when a slit 21 has only a first segment 4 and this first segment 4 is very short, almost point-shaped.

A sensor arrangement 8 arranged on the side of the visible side 11 of the cover element 1 along the imaginary line 20 detects energy portions of at least one laser pulse 3 transmitting through the first residual wall segment $R_4$ before energy portions transmitting through the second residual wall segment $R_5$ can be detected. If the position of the laser beam 7 at the time point that the sensor signal is emitted is known, a first residual wall segment $R_4$ can be associated with this sensor signal. The energy input along the first segments 4 is stopped when the first residual wall segment thickness $r_4$ has been detected or when it has reached a predefined allowance. This can take place for different first segments 4 in different machining cycles Z because, as has already been explained, either the removal of material does not take place homogeneously or must vary in size, e.g., because the cover element 1 is structured on its visible side 11.

The detected first residual wall segment thickness $r_4$ is at least virtually identical for all first segments 4.

With knowledge of the process parameters, the second residual wall segment thickness $r_5$ below the respective adjoining second segments 5 can be inferred from the detected first residual wall segment thickness $r_4$. The knowledge acquired with respect to the effect of the energy input is utilized for this purpose. Particularly when the cover element 1 does not have a constant thickness, which can result, e.g., from a structured surface of the visible side 11, or when the cover element 1 comprises inhomogeneous material layers, it can be advantageous when there is a plurality of first segments 4 spaced apart from one another along a slit 21 at which the first residual wall segment thickness $r_4$ can be detected. The second residual wall segment thickness $r_5$ of the second residual wall segment $R_5$ can then be adjusted more precisely, which is advantageous particularly with wide variations in the second residual wall segment thickness $r_5$ over the entire slit 21 after an identical number of machining cycles Z.

The tear strength of the line of weakness 2 can accordingly be adjusted in the area of the slits 21 by a second residual wall segment thickness $r_5$ adapted to the characteristics of the cover element 1. The process is very advantageous particularly when the cover element 1 has a tear-resistant layer on the visible side 11 which is only slightly transparent for the laser pulses 3.

The fact that, in proportion to the slit length l, it is only in first segments 4 of a short first length $l_4$ that a removal of material is carried out to a depth such that components of the energy of at least one laser pulse 3 transmit through the remaining first residual wall segment $R_4$ allows a freedom for deciding about a further removal of material along the second segments 5 for the longer second lengths $l_5$.

Accordingly, further removal of material can be stopped and the remaining second residual wall segment thickness $r_5$ then remains larger than the first residual wall segment thickness $r_4$. A further removal of material along the second segments 5 can also take place in additional machining cycles Z subsequent to the process without the second residual wall segment thickness $r_5$ reaching the now constant first residual wall segment thickness $r_4$ or until the second residual wall segment thickness $r_5$ reaches the now constant first residual wall segment thickness $r_4$.

The process parameters could then also be changed for the additional machining so that, for example, the second residual wall segment thickness $r_5$ approximates the now constant first residual wall segment thickness $r_4$ more slowly.

The advantage of the process consists particularly in that the tear strength can be influenced comparatively better by varying the first residual wall segment thickness $r_4$ than if the removal of material were carried out as in the prior art in its entirety over a plurality of machining cycles Z until the residual wall thickness along the entire slit length l is detected and is accordingly very small and the machining is stopped in a localized manner when the residual wall thickness has been detected.

The embodiment examples of the process differ from one another essentially through the differing quantities of laser pulses 3, laser pulses 3 with different pulse length w and/or pulse amplitude A within individual machining cycles Z and/or between the machining cycles Z participating in the formation of a slit 21. The introduction of a higher energy into the cover element 1 along the first segment 4 can accordingly be carried out through different pulse regimes.

Before the entire slit 21 is acted upon by energy in one of the machining cycles Z, energy is applied only to the first segments 4 in preceding machining cycles Z, which corresponds to a pre-machining with respect to time.

The higher energy input along the second segment 5 can also be carried out by pulse amplitude modulation and/or pulse length modulation.

It is crucial that more energy is introduced along the first segment 4 over the machining cycles Z.

The introduction of differing energy distribution over the slit length l will be explained in particular in the following referring to various embodiment examples for the process.

FIGS. 1*a* to 1*g* show a power-time diagram (FIGS. 1*a*-1*d*) for a plurality of machining cycles Z of a first embodiment example of the process, a power-time diagram (FIG. 1*e*) for the sum of all of the machining cycles Z, and a sectional view (FIG. 1O and top view (FIG. 1*g*) of a line of weakness 2 which is produced by the process according to the first embodiment example and which comprises slits 21 and bridges 22. For the sake of simplicity, only the laser pulse 3 or laser pulses 3 participating in the formation of an individual slit 21 are shown in the power-time diagram.

In a first machining cycle $Z_1$ (FIG. 1a), a first laser pulse 3 with a comparatively short pulse length $w_1$ is directed to the imaginary line 20 starting at a first time point $t_1$ with respect to the start of the first machining cycle $Z_1$. Within the second machining cycle $Z_2$ (FIG. 1b), a second laser pulse 3 with an identical comparatively short pulse length $w_1$ is directed to the cover element 1 starting at a same first time point $t_1$ with respect to the start of the second machining cycle $Z_2$ so that the energy inputs through the first laser pulse 3 and second laser pulse 3 overlap.

Starting with the third machining cycle $Z_3$ up to an nth machining cycle $Z_n$ in which portions of the energy of the nth laser pulse 3 are detected, further laser pulses 3 are directed to the imaginary line 20 in each instance starting at a same first time point $t_1$ with respect to the start of the respective machining cycle Z. The further laser pulses 3 have a comparatively long pulse length $w_2$ such that at a given forward feed speed they end at the same second time points $t_2$, with respect to the respective start of machining cycle Z, at which the further laser pulses 3 were guided over the slit length l.

Since the forward feed speed is constant, the laser pulses 3 impinge on the same insertion elements along the imaginary line 20 at the same time points with respect to the start of the machining cycle Z.

A summing of the laser pulses 3 over all n machining cycles Z shows an energy input in the time span between the first time point $t_1$ and the second time point $t_2$ with respect to the start of the machining cycles Z.

The ratio of the comparatively long pulse length $w_2$ to the comparatively short pulse length $w_1$ in this case determines the ratio of the slit length l to the first length $l_4$ of the first segment 4. The short pulse length $w_1$ was selected in coordination with the forward feed speed and the transmission characteristics of the material adjoining the visible side 11 of the cover element 1 such that a desired minimum first residual wall segment thickness $r_4$ is achieved when the transmitting energy portions are detected.

FIGS. 1f and 1g show a line of weakness 2 forming in an exemplary cover element 1 comprising only one layer.

A second embodiment example analogous to the first embodiment example is shown in FIGS. 2a-2g. The second embodiment example differs from the first embodiment example in that instead of only one laser pulse 3 with a comparatively short pulse length $w_1$ two laser pulses 3 of this kind are operative per slit 21 in the first two machining cycles Z. The advantages of this have already been mentioned.

FIGS. 2f and 2g show a line of weakness 2 forming in an exemplary cover element 1 comprising three layers. The first residual wall segment thickness $r_4$ is detected in this case, for example, at a time point when the second residual wall segment thickness $r_5$ is still greater than the thickness of the layer adjoining the visible side 11.

The two embodiment examples mentioned above may be varied, particularly in that only one machining cycle Z is carried out or more than two machining cycles Z are carried out with laser pulses 3 of comparatively short pulse length $w_1$.

The power P of the laser pulses 3 which is shown over the pulse amplitude A and which is assumed to be constant in this case for the laser pulses 3 over a machining time t could also differ for the individual machining cycles Z.

According to a third embodiment example shown in FIGS. 3a-3g which is analogous to the preceding embodiment examples, the machining of a slit 21 is carried out in all of the machining cycles Z with only one same laser pulse 3 which is amplitude-modulated over its pulse length w. This offers an advantage with respect to time because the removal of material can take place in real time without any loss of time. The laser pulse 3 starts in every machining cycle Z at the same first time point $t_1$ with respect to the start of the respective machining cycle Z. Contrary to the illustration, the laser pulse 3 can also have only one amplitude peak or also more than two amplitude peaks. The interval between two consecutive laser pulses 3 can be utilized here for reversing the forward feed movement of the pulsed laser beam 7, which results in a high energy efficiency of a laser 6 that is used.

According to a fourth embodiment example shown in FIGS. 4a-4g which is analogous to the preceding embodiment examples, the machining of a slit 21 is carried out in all of the machining cycles Z with a same sequence of laser pulses 3 having a same pulse length w. Two by two adjacent laser pulses 3 have a large pulse amplitude $A_1$ compared to the other laser pulses 3 with a small pulse amplitude $A_2$. The sequence of laser pulses 3 starts in every machining cycle Z at a same first time point $t_1$ with respect to the start of the respective machining cycle Z.

The pulse length w, forward feed speed and pulse repetition frequency are preferably adapted to one another such that no individual perforations are formed but rather a slit 21. A fifth embodiment example analogous to the preceding embodiment examples which is shown in FIGS. 5a-5g differs from the fourth embodiment example in that two by two adjacent laser pulses 3 have a long pulse length $w_2$ compared to the other laser pulses 3 with a short pulse length $w_1$. The smaller energy input along the second segment 5 is caused in this case by the intervals between the laser pulses 3 of comparatively short pulse length $w_1$ which are preferably sufficiently short that the energy input still leads to a slit 21 and not to perforation holes which are separated from one another.

A very simple configuration of the process is described referring to a sixth embodiment example in FIGS. 6a-6g which is analogous to the preceding embodiment examples.

In this case, same shorter sequences of laser pulses 3 are used in the two first machining cycles Z with a smaller quantity of laser pulses 3 than is used in the subsequent machining cycles Z in a longer sequence. The laser pulses 3 are constant at least with respect to their pulse length w over the entire process and are constant at least over their pulse amplitudes A within each machining cycle Z. The sequence of laser pulses 3 starts in every machining cycle Z at a same first time point $t_1$ with respect to the start of the respective machining cycle Z. The longer sequences of laser pulses 3 have a length such that at a given forward feed speed they end at the same second time points $t_2$, with respect to the respective start of machining cycle Z, at which the laser pulses 3 were guided over the slit length l.

The process according to the fourth, fifth and sixth embodiment examples can also be modified such that the slits 21 are formed by a sequence of closely adjacent perforation holes which overlap, directly adjoin one another or are separated from one another over the depth of the slit 21 at least partially by residual material.

Figure 7:
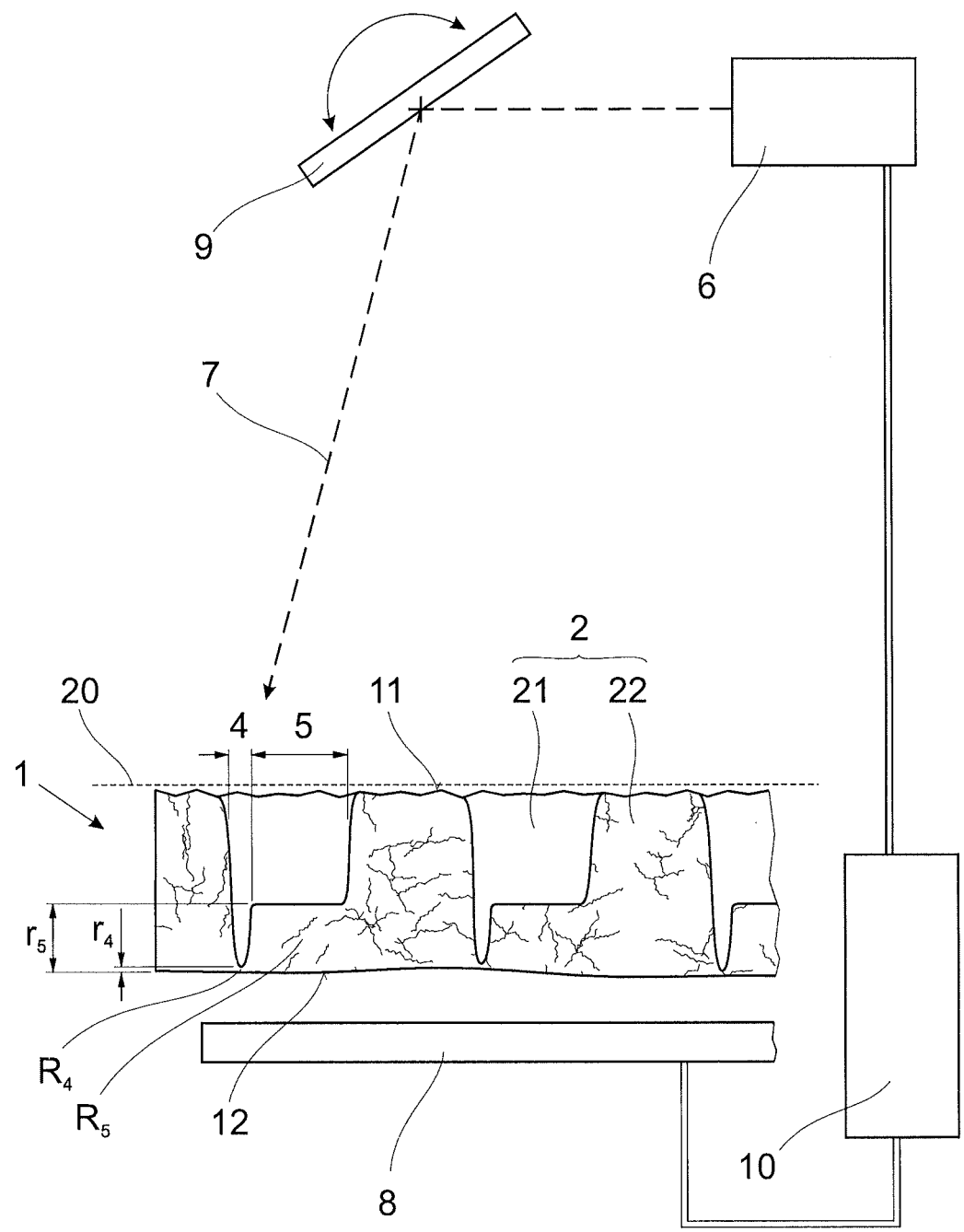
FIG. 7 is a schematic diagram of an apparatus for implementing the process.

FIG. 7 shows a schematic diagram of an apparatus by which the process can be carried out. It has a laser 6 which directs a pulsed laser beam 7 via a movement device, in this case a scanner 9, to the back side 12 of the stationary cover element 1. The pulsed laser beam 7 is guided repeatedly along an imaginary line 20 (not shown in FIG. 7) along which the line of weakness 2 is to be produced. A sensor arrangement 8 is positioned along the imaginary line 20 below the cover element 1. The sensor arrangement 8 is connected to a controlling and computing unit 10, as is the laser 6.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 1 cover element
11 visible side (of the cover element 1)
12 back side (of the cover element 1)
2 line of weakness
20 imaginary line
21 slit
22 bridge
3 laser pulse
4 first segment (of a slit 21)
5 second segment (of a slit 21)
6 laser
7 laser beam
8 sensor arrangement
9 scanner
10 controlling and computing unit
l slit length
$l_4$ first length (of the first segment 4)
$l_5$ second length (of the second segment 5)
$R_4$ first residual wall segment (along the first segment 4)
$R_5$ second residual wall segment (along the second segment 5)
$r_4$ first residual wall segment thickness (along the first residual wall segment $R_4$)
$r_5$ second residual wall segment thickness (along the second residual wall segment $R_5$)
P power
A pulse amplitude
$A_1$ (comparatively) large pulse amplitude
$A_2$ (comparatively) small pulse amplitude
w pulse length
$w_1$ short pulse length
$w_2$ long pulse length
Z machining cycle
$Z_1$ first machining cycle
$Z_2$ second machining cycle
$Z_3$ third machining cycle
$Z_n$ nth machining cycle
t machining time (over a machining cycle Z)
$t_1$ first time point
$t_2$ second time point

What is claimed is:

1. Process for producing a line of weakness by removal of material in a cover element having a visible side and a back side opposite the visible side, comprising directing laser pulses with an energy determined by a pulse amplitude and a pulse length to said back side and introducing said energy into said cover element repeatedly along an imaginary line at a forward feed speed in a machining cycle so that the line of weakness is formed as a result of removal of material through at least one slit having a slit length and a residual wall thickness of a residual wall adjoining said visible side below said at least one slit, steadily decreasing said residual wall thickness with each machining cycle so that said residual wall thickness becomes sufficiently small that energy portions of the laser pulses which transmit through the residual wall are detected by a sensor arrangement thereby detecting said residual wall thickness, introducing energy point by point along the at least one slit along said imaginary line, said introduced energy being greater in at least one first segment with a first length than in at least one second segment with a second length such that, in each instance, a first residual wall segment thickness of a first residual wall segment of the residual wall along the at least one first segment decreases more quickly than a second residual wall segment thickness of a second residual wall segment of the residual wall along the at least one second segment so that, in each instance, the first residual wall segment thickness of the first residual wall segment along the at least one first segment is detected before the second residual wall segment thickness for the second residual wall segment along the at least one second segment can be detected, and drawing inferences about the second residual wall segment thickness of the second residual wall segment along the at least one second segment without detecting this second residual wall segment thickness.

2. The process according to claim 1, wherein said energy input per slit along the first length of the at least one first segment at least in the first of the machining cycles is carried out by means of at least one of the laser pulses which has a pulse length shorter than a pulse length in a subsequent machining cycle, and the energy input in further machining cycles along the slit length of the slit is carried out by means of one of the laser pulses which has a long pulse length compared to the pulse length in a previous machining cycle.

3. The process according to claim 2, wherein a pulse amplitude of the laser pulses is the same at least over one of the machining cycles.

4. The process according to claim 1, wherein the energy input per slit and per machining cycle is carried out in each instance with at least one same laser pulse which is amplitude-modulated over its pulse length with a comparatively large pulse amplitude for the energy input along the first length of the at least one first segment and a comparatively small pulse amplitude for the energy input along the second length of the at least one second segment.

5. The process according to claim 1, wherein the energy input per slit and per machining cycle is carried out with a same sequence of laser pulses in which at least one of the laser pulses has a comparatively large pulse amplitude for the energy input along the first length of the at least one first segment and a plurality of the laser pulses follow one another directly and have a comparatively small pulse amplitude for the energy input along the second length of the at least one second segment.

6. The process according to claim 1, wherein the energy input per slit and per machining cycle is carried out with a same sequence of laser pulses in which at least one of the laser pulses has a comparatively long pulse length for the energy input along the first length of the at least one first segment and a plurality of the laser pulses follow one another directly and have a comparatively small pulse amplitude for the energy input along the second length of the at least one second segment, and the pulse amplitude of the laser pulses with the comparatively long pulse length is not larger than the pulse amplitude of the laser pulses with the comparatively short pulse length.

7. The process according to claim 1, wherein the energy input per slit along the first length of the at least one first segment is carried out at least in the first of the machining cycles by means of at least one of the laser pulses, and along the slit length of the slit in further machining cycles the energy input is carried out with a same sequence of laser pulses, wherein the sequence of laser pulses comprises a larger quantity of laser pulses than laser pulses participating in the energy input per slit in the at least first machining cycle of the machining cycles, and the pulse length and the pulse amplitude of all of the laser pulses are constant at least over one of the machining cycles.

8. The process according to claim 1, further comprising machining of said second segments carried out subsequent to said machining cycles.

* * * * *